Oct. 11, 1955     E. G. ERSON     2,720,428
LOAD COMPENSATING BRAKE APPARATUS
Filed Nov. 8, 1951
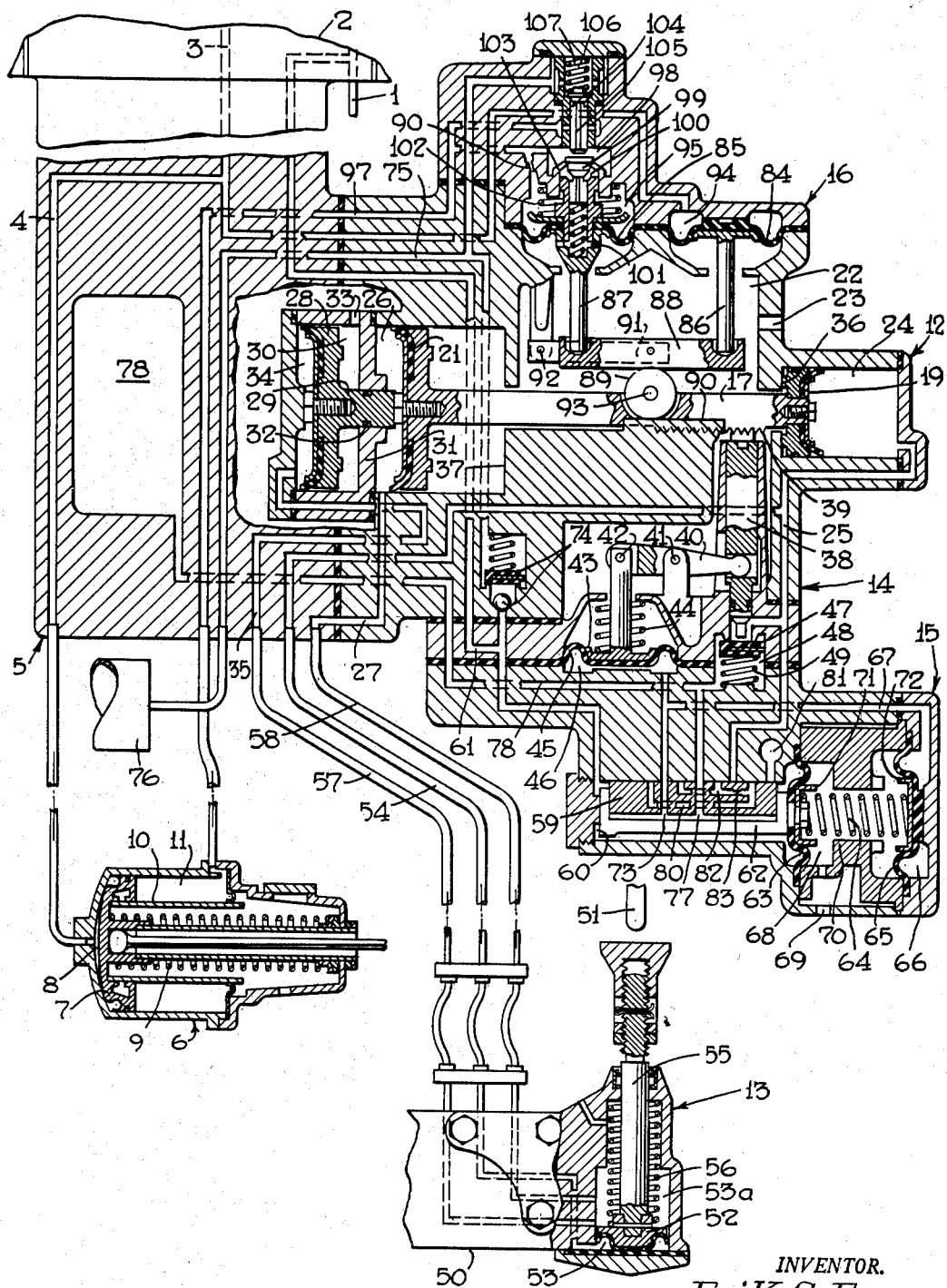
INVENTOR.
Erik G. Erson
BY
Adelbert A. Steinmiller
ATTORNEY

United States Patent Office 2,720,428
Patented Oct. 11, 1955

2,720,428

LOAD COMPENSATING BRAKE APPARATUS

Erik G. Erson, Wilkinsburg, Pa., assignor to Westinghouse Air Brake Company, Wilmerding, Pa., a corporation of Pennsylvania Application November 8, 1951, Serial No. 255,438

9 Claims. (Cl. 303—22)

This invention relates to fluid pressure brake apparatus for railway vehicles and more particularly to the type for braking a vehicle in accordance with the degree of load carried by the vehicle.

In the co-pending application of Earle S. Cook, Serial No. 238,918, filed July 27, 1951, there is disclosed a brake apparatus which is operative upon a reduction in brake pipe pressure to supply fluid under pressure to effect an application of brakes on a vehicle. The brake apparatus includes a load compensating valve portion which is automatically adjustable in accordance with the load on the vehicle to correspondingly limit the degree of a brake application effected by such fluid under pressure.

The load compensating valve portion provides for a relatively large number of adjustments corresponding to a relatively large number of different degrees of load. It is believed, however, that three adjustments, corresponding to an empty vehicle, a fully loaded vehicle and a partially loaded vehicle, such as one-half load, are adequate for freight service and the principal object of the invention is therefore the provision of a novel, relatively simple and inexpensive three adjustment device for use with brake apparatus such as above described.

Other objects and advantages will become apparent from the following more detailed description of the invention.

In the accompanying drawing, the single figure is a diagrammatic view of a portion of a fluid pressure brake apparatus embodying the invention.

Description

As shown in the drawing, reference numeral 1 designates the usual brake pipe which is connected to a brake controlling valve device 2, such as disclosed in the above mentioned pending application, adapted to operate, in the usual manner, upon a reduction in pressure in said brake pipe to supply fluid under pressure to a passage 3. Fluid under pressure thus supplied to passage 3 is adapted to flow through a passage 4 in a control device 5, embodying the invention, to a brake cylinder device 6 for actuating same to effect either a service or an emergency application of brakes, according to the reduction in brake pipe pressure. Upon recharging of brake pipe 1 with fluid under pressure the brake controlling valve device 2 is adapted to operate, in the usual manner, to release fluid under pressure from passages 3 and 4 and the brake cylinder device 6 to effect a release of brakes.

The brake cylinder device 6 may comprise a casing containing a piston 7 at one side of which is the usual pressure chamber 8 in which fluid under pressure from passage 4 is adapted to become effective on said piston to move same in the direction of the right hand for applying brakes. Upon release of fluid under pressure from chamber 8 by way of passages 4 and 3 a return spring 9 is adapted to move piston 7 in the direction of the left hand back to a brake release position in which it is shown on the drawing. A cylinder 10 encircling the release spring 9 and attached at one end to piston 7 and slidably mounted adjacent its opposite end in the casing cooperates with said piston and casing to provide a load compensating cylinder 11 around said cylinder for receiving fluid under pressure to oppose pressure of fluid in chamber 8 acting on piston 7. As will be later described in detail, when a vehicle is fully loaded, the chamber 11 will be vented in order that the brakes on the vehicle will be applied to a degree governed by the full pressure of fluid in chamber 8 acting on piston 7. With a vehicle empty a certain maximum pressure of fluid will be provided in chamber 11 whereby the degree of braking of the empty vehicle will be limited to the differential in the opposing forces thus provided on piston 7. For a partially loaded vehicle, for example, a half load, a certain lower pressure of fluid will be provided in chamber 8 in order to obtain a greater differential in opposing forces on piston 7 as necessary to provide a greater braking force for the partially loaded car than for the empty vehicle.

The control device 5 comprises a casing containing a load adjustable control device 12, a strut device 13 for controlling adjustment of said control device 12, a locking device 14 for locking said device 12 in an adjusted position, a cut-off valve device 15 for controlling operation of said devices 12, 13 and 14, and a fluid pressure control device 16 for regulating pressure of fluid in the brake cylinder compensating chamber 11 according to the adjustment of the control device 12 and hence according to the load on the vehicle.

The control device 12 comprises a brake control element or rod 17 to one end of which is connected a piston 19 and to the opposite end of which is connected a piston 21. The rod 17 is contained in a chamber 22 which is open to atmosphere through a passage 23 whereby the adjacent faces of pistons 19 and 21 are constantly subject to atmospheric pressure. At the opposite face of piston 19 is a pressure chamber 24 open to a fluid pressure supply and release passage 25, while at the opposite side of piston 21 is a pressure chamber 26 open to a fluid pressure supply and release passage 27. A piston 28, which may be of the same diameter as piston 21 and both of which are of greater diameter than piston 19, has a rod 29 projecting from one side thereof through a non-pressure chamber 30 at one side of piston 28 and through a bore in a partition wall 31 separating chamber 30 from chamber 26 into the latter chamber where its end contacts piston 21. A sealing ring 32 carried by the piston rod 29 has sealing and sliding contact with the wall of the bore through wall 31 for preventing leakage of fluid pressure from chamber 26 to chamber 30. Chamber 30 is open to atmosphere through a vent 33. At the opposite side of piston 28 is a pressure chamber 34 open to a passage 35.

As will be later described, when fluid under pressure is present in pressure chamber 24 with pressure chambers 26 and 34 both vented such fluid acting on piston 19 is adapted to move the brake control rod 17 to a position for braking an empty vehicle in which position these parts are shown in the drawing and which is defined by engagement of piston 19 with a shoulder 36 in the casing. When fluid under pressure is present in chambers 24 and 34 and chamber 26 is vented, the piston 28, being of greater area than piston 19, will move until stopped by contact with the partition wall 31 and during such movement will move piston 21, rod 17 and piston 19 to a position for a partially loaded vehicle. When fluid under pressure is present in chamber 26 on piston 21 with chamber 24 also charged with fluid under pressure, said piston being of greater area than piston 19 will move the brake control element 17 to a position for a fully loaded car defined by contract between piston 21 and a shoulder 37 in the casing. The control of the fluid pressure in chambers 24, 26 and 34 will be hereinafter described, it being merely desired at this point of the description to bring out that the brake control rod 17 is adapted to be moved to either one or another of three different brake control positions corresponding to different degrees of load on a vehicle.

The locking device 14 comprises a plunger 38 slidably mounted in a bore in the casing and having on one end teeth for locking engagement with teeth 39 provided along one side of rod 17 to hold said rod in an adjusted position. A lever 40 having one end connected to plunger 38 and fulcrumed intermediate its ends on a pin 41 carried by the casing is connected at its opposite end by a pin 42 to a follower 43. A spring 44 acts on one side of follower 43 for actuating lever 40 to move plunger 38 into locking engagement with rod 17. The opposite side of follower 43 is engaged by one side of a flexible diaphragm 45. At the opposite side of diaphragm 45 is a chamber 46. When fluid under pressure is supplied to chamber 46, as will be later described, the diaphragm 45 will be deflected thereby against spring 44 to operate lever 40 to move plunger 38 out of locking engagement with rod 17. Upon release of fluid under pressure from chamber 46 spring 44 will move plunger 38 into locking engagement with rod 17. A check valve 47 contained in a chamber 48 and normally seated by a spring 49 is arranged to be unseated by plunger 38 following disengagement thereof from rod 17.

The strut device 13 is adapted to be carried by a load carrying sprung portion 50 of a vehicle underneath an unsprung portion 51, whereby said device will be spaced away from said unsprung portion a distance which varies according to the degree of load on the vehicle.

The strut device 13 comprises a casing containing a vertically movable piston 52 at the lower side of which is a pressure chamber 53 open by way of a pipe 54 to passage 25 in the control device 12. Projecting upwardly from the upper side of piston 52 through a non-pressure chamber 53a is a rod 55 terminating outside of the casing below the unsprung portion 51 of the vehicle. A spring 56 contained in chamber 53a acts on piston 52 for urging it to the position in which it is shown in the drawing.

When the vehicle is empty the strut device 13 will occupy a position relative to the unsprung portion 51 of the vehicle such as it is shown in the drawing and in which upward movement of piston 52 will be so limited by engagement with the unsprung portion 51 as not to open chamber 53 to a pipe 57 which is connected to piston chamber 34 in the control device 12. When the vehicle is substantially half-loaded the strut device 13 will occupy a lower position relative to the unsprung portion 51 of the vehicle in order to permit sufficient movement of piston 52 from the position in which it is shown in the drawing to open pipe 57 to chamber 53. When the vehicle is fully loaded such movement of piston 52 against spring 56 will be permitted as to open chamber 53 to pipe 57 and also to another pipe 58 leading to passage 27 and thence piston chamber 26 in the control device 12.

The cut-off valve device 15 comprises a slide valve 59 contained in chamber 60 which is in constant communication with brake pipe 1 by way of a passage 61. The slide valve is connected by a stem 62 to a flexible diaphragm 63 for movement therewith. The diaphragm 63 is subject on one face to pressure of fluid in chamber 60 and on the opposite face to pressure of a spring 64 one end of which engages said diaphragm while the opposite end engages one side of a coaxially arranged and larger flexible diaphragm 65 at the opposite side of which is a pressure chamber 66 open by way of a passage 67 to the seat of a slide valve 59 and to diaphragm chamber 46 in the locking device 14. Between the two diaphragms 63 and 65 is a chamber 68 which is open to atmosphere by a vent 69. Extending into chamber 68 is a casing stop 70 arranged for contact by followers 71 and 72 associated with diaphragms 63 and 65, respectively, for limiting deflection of said diaphragms toward each other.

Whenever the pressure of fluid in brake pipe 1 is less than a chosen degree, such as ten pounds, spring 64 will deflect diaphragm 63 against such pressure in chamber 60 and thereby move slide valve 59 to a cut-in position in which it is shown in the drawing and which may be defined by engagement of the left hand end of stem 59 with the casing. In this position of slide valve 59 passage 67 and diaphragm chamber 66 will be open to brake pipe 1 through a port 73 in said slide valve, and spring 64 will initially be holding the diaphragm 65 in the position in which it is shown in the drawing.

In initially charging brake pipe 1 with fluid under pressure, or upon charging said brake pipe following venting thereof to any pressure less than, for example ten pounds, fluid under pressure from said brake pipe will flow to passage 61 and thence past two serially arranged check valves 74 to a passage 75 leading to a load braking reservoir 76 for charging said reservoir to substantially the pressure in the brake pipe. At the same time, fluid supplied from the brake pipe to passage 61 will flow to valve chamber 60 in the cut-off valve device 15 and thence through a port 77 in slide valve 59 to a passage 78 leading to the check valve chamber 48 and to a volume reservoir 78 for charging said chamber and reservoir with fluid at the pressure in said brake pipe. At the same time, fluid under pressure will also flow from valve chamber 60 through port 73 to passage 67 and thence to diaphragm chambers 46 and 66. When a sufficient pressure of fluid is thus obtained in diaphragm chamber 46 to overcome the opposing pressure of spring 44 on diaphragm 45 said diaphragm will deflect against spring 44 and move plunger 38 out of locking engagement with rod 17 followed by unseating of check valve 47 by said plunger.

Upon unseating of check valve 47 the fluid under pressure present in volume reservoir 78 will promptly flow through passage 78 and pass said check valve to passage 25 and thence to piston chamber 24 of the control device 12 and also through pipe 54 to piston chamber 53 in the strut device 13. Piston chambers 26 and 34 in the control device 12 will at this time be at atmospheric pressure whereby the pressure of fluid provided in chamber 24 and acting on piston 19 will move the rod 17 to its empty position, in which it is shown in the drawing, unless already so positioned.

Fluid under pressure supplied from the volume reservoir 78 to passage 25 and thence to piston chamber 53 in the strut device 13 will move the piston 52 upwardly against spring 56 until such movement is stopped by contact between the piston rod 55 and the unsprung portion 51 of the vehicle.

If the vehicle is empty this movement of piston 52 will be so limited as not to open pipe 57 to chamber 53 whereby neither piston chamber 26 or 34 in the control device 12 will be supplied with fluid under pressure from chamber 53 and the brake control element 17 will be held in its empty position, corresponding to the empty condition of the vehicle, by pressure of fluid in chamber 24 acting on the piston 19.

If the vehicle is carrying, for example a half load, the strut device 13 will be so disposed relative to the unsprung portion 51 of the vehicle that the fluid under pressure provided in chamber 53, as above described, will move the piston 52 past the opening to pipe 57 by the time the piston rod 55 contacts the unsprung portion 51 of the vehicle. Fluid under pressure will then flow from chamber 53 to pipe 57 and thence to piston chamber 34 in the control device 12. When the pressure of fluid thus obtained in chamber 34 and acting on piston 28 becomes increased sufficiently to provide a force which exceeds the opposing force created by pressure of fluid in chamber 24 on the smaller piston 19, the piston 28 will move the pistons 21, 19 and the brake control element 17 to their partial load position defined by contact between piston 28 and the partition wall 31.

If the vehicle is fully loaded the strut device 13 will be so disposed with respect to the unsprung portion 51 of the vehicle as to permit piston 52 to be moved by fluid under pressure supplied to chamber 53 past the openings to both pipes 57 ad 58, whereupon fluid under pressure will flow from said chamber to pipe 58 and thence to piston chamber 26 in the control device 12. When a sufficient pressure of fluid is thus obtained in chamber 26 the piston 21 will move the brake control element 17 and piston 19 against the pressure of fluid in chamber 24 acting on the latter and smaller piston to the position for a fully loaded vehicle defined by contact between the piston 21 and the casing shoulder 37.

It will thus be seen that during charging of brake pipe 1 the strut device 13 carried by a sprung portion of the vehicle and cooperating with the unsprung portion 51 will cause the brake control element 17 to assume a position corresponding to the loaded condition of the vehicle.

While the brake control rod 17 is being adjusted, as above described, the pressure of fluid in brake pipe 1, in valve chamber 60 and diaphragm chamber 66 of the cut-off valve device will be gradually increasing. This increase in pressure in chamber 66 on diaphragm 65 will cause same to deflect against spring 64 for correspondingly increasing the pressure of said spring against diaphragm 63 to hold the diaphragm 63 against movement by the increasing brake pipe pressure in chamber 60. Such deflection of diaphragm 65 will continue until the pressure of fluid in the brake pipe and diaphragm chamber 66 is increased to a chosen degree, such as forty pounds, when it will be stopped by contact of follower 72 with the casing stop 70. Further increase in pressure in brake pipe 1 and chamber 60 will then deflect diaphragm 63 against spring 64 until stopped by engagement of follower 71 against stop 70; this deflection of diaphragm 63 moving the slide valve 59 to a cut-off position.

In the cut-off position of slide valve 59, ports 73 and 77 will be out of registry with passages 67 and 78, respectively, in order to cut off the supply of fluid under pressure to such passages from the brake pipe 1, while a port 80 in said slide valve 59 will connect passage 67 to an atmospheric passage 81, and a port 82 in said valve will connect passages 78 and 25 through a choke 83 to passage 80 and thence to atmosphere by way of passage 81. As a result, fluid under pressure will be promptly released from diaphragm chamber 46 in the latch device 14 and diaphragm chamber 66 in the cut-off valve device 15. The venting of diaphragm chamber 46 will permit spring 44 to move the plunger 38 into locking engagement with the brake control rod 17 to hold it in its load adjusted position while the venting of chamber 66 will permit spring 64 to move the diaphragm 65 to the position in which it is shown in the drawing for reducing the pressure of said spring on diaphragm 63 to such a degree that diaphragm 63 and slide valve 59 will remain in the cut-off position until brake pipe pressure in chamber 57 is reduced, subsequently, to a relatively low pressure, such as ten pounds.

The venting of passages 78 and 25 merely dissipates fluid under pressure remaining in the volume reservoir 78, check valve chamber 48, piston chamber 24 in the control device 12, piston chamber 53 in the strut device 13 and piston chamber 34 or 26 in the control device 12, in case of either of the latter chambers being supplied with fluid under pressure by said strut device as above described, it being noted, however, that the choke 83 restricts such venting with respect to release of fluid under pressure from diaphragm chamber 46 to insure operation of plunger 38 into locking engagement with rod 17 while said rod is yet positively held in the position to which it was adjusted, as above described. Upon the venting of fluid under pressure from the strut piston chamber 53 through port 82 in the cut-off slide valve 59, as above described, spring 56 will return the piston 32 to the position in which it is shown in the drawing out of contact with the unsprung portion 51 of the vehicle.

It will now be seen that in charging the brake pipe 1 with fluid under pressure the brake control rod 17 will be adjusted to either one of three different positions according to whether the vehicle is empty, fully loaded or partially loaded, respectively, and will then be locked by plunger 38 in such adjusted position until the pressure in the brake pipe is subsequently reduced to a relatively low degree.

As before mentioned, the numeral 16 designates a fluid pressure control device and said device is adapted to operate upon supply of fluid under pressure to the brake cylinder pressure chamber 8 to control pressure of fluid in the brake cylinder compensating chamber 11 for thereby varying the degree of braking of the vehicle in accordance with the adjustment of a brake control rod 17.

By way of example, the fluid pressure control device 16 may comprise two spaced-apart flexible diaphragms 84 and 85 subject at one side to atmospheric pressure in the vented chamber 22 and connected by parallel ar- arranged struts 86 and 87 to opposite ends of a scale beam 88. The beam 88 is mounted between its ends to rock on an adjustable fulcrum in the form of a roller 89 supported on a flat surface 90 in the casing. The beam 88 is held in alignment with the struts 87 and 86 by pivotal connection with a link 91 in turn pivotally connected by a pin 92 to the casing of the device.

The fulcrum roller 89 is pivotally mounted on a pin 93 carried by the brake control element 17 whereby said fulcrum will be moved by and occupy positions relative to the scale beam 88 corresponding to the positions of the brake control rod 17. When the rod 17 is in its empty car position, as shown in the drawing, the fulcrum roller 89 will engage scale beam 88 substantially mid-way between its connections with struts 86, 87. When rod 17 is in the position for a fully loaded vehicle the fulcrum roller 85 will be disposed substantially under the end of strut 86, and when in the position for a half loaded vehicle said roller will engage the beam 88 at a point intermediate those engaged in the empty and full load positions, respectively, of rod 17.

At the side of diaphragm 84 opposite chamber 22 is a pressure chamber 94 which is in constant communication with the brake cylinder passage 4, while at the corresponding side of diaphragm 85 is a pressure chamber 95 open through a stabilizing choke 96 to a passage 97 which is in constant communication with the compensating chamber 11 in the brake cylinder device 6. Passage 97 also leads to a chamber 98 containing a release valve 99 arranged to cooperate with a seat 100 on the diaphragm strut 87 to control communication between the brake cylinder compensating chamber 11 and atmosphere by way of chamber 98, a passageway 101 in said strut and the vented chamber 22. With the diaphragm strut 87 in its normal position, in which it is shown in the drawing, and to which it is urged by a bias spring 102, the release valve 99 is supported out of contact with its seat by a casing rib 103. Above the release valve 99 is a coaxially arranged supply valve 104 having a stem 105 depending through a bore in the casing into chamber 98 for engagement by release valve 99; the passage 97 being constantly open to said bore. The supply valve 104 is contained in a chamber 106 adapted to be constantly supplied with fluid under pressure from the reservoir 76 by way of passage 75. A bias spring 107 in chamber 106 acts on the supply valve 104 urging it to its seat.

In operation, when fluid under pressure is supplied to the brake cylinder passage 4 and thereby to the brake cylinder pressure chamber 8 to effect an application of brakes on the vehicle, such fluid pressure will become effective in chamber 94 on diaphragm 84.

Now assuming that the fulcrum roller 89 is in a position between the struts 87 and 86, as shown in the drawing, the pressure of fluid in chamber 94 will deflect the diaphragm 84 downward and through the medium of strut 86 beam 88 and strut 87 deflect the diaphragm 85 upward to first seat the release valve 99 and through said valve and supply valve stem 105 to unseat the supply valve 104. Fluid under pressure will then flow from the supply reservoir 76 past the supply valve 104 to passage 97 and thence to the brake cylinder compensating chamber 11 and also through choke 96 to chamber 95. When the pressure of fluid thus obtained in chamber 95 and acting on diaphragm 85 becomes sufficient with respect to the opposing force developed by pressure of fluid in chamber 94 on diaphragm 84, the bias spring 102 will deflect the diaphragm 85 downward against said opposing force to permit closing of valve 104 to thereby limit the pressure of fluid obtained in the brake cylinder compensating chamber 11 in accordance with the pressure of fluid acting in chamber 94 on diaphragm 84 and the position of the fulcrum roller 89 with respect to beam 88.

With the fulcrum roller 89 engaging the beam 88 midway between the struts 86 and 87, for an empty vehicle, it will thus be apparent that the supply valve 104 will close when the pressure of fluid obtained in the brake cylinder compensating chamber 11 and diaphragm chamber 95 equals substantially that acting in the brake cylinder pressure chamber 8 and diaphragm chamber 94 and the degree of braking of the empty vehicle will be limited by the differential in forces developed by the substantially equal pressures of fluid in the brake cylinder chambers 8, 11 acting on the opposite and different areas of brake cylinder piston 7.

If the fulcrum roller 89 is in contact with beam 88 at a point mid-way between its empty position and the strut 86, as it will be for a partly loaded vehicle, it will be seen that the supply valve 104 will close to limit the pressure of fluid obtained in the compensating chamber 11 according to the ratio of the lever arms of beam 84 and therefore to a degree less than for an empty vehicle, whereby the braking force developed by the brake cylinder piston 7 will be correspondingly greater, as necessary for the partially loaded vehicle.

If the fulcrum roller 89 is directly under the strut 86, as it will be for a fully loaded vehicle, it will be seen that pressure of fluid provided in chamber 94 to act on diaphragm 84 will not operate the beam 88, as a result of which the release valve 98 will remain open to maintain the brake cylinder compensating chamber 11 in communication with atmosphere. Under this fully loaded vehicle condition the vehicle brakes will therefore be applied with a force equal only to the pressure of fluid in the brake cylinder pressure chamber 8 acting on piston 7.

When it is desired to release the brakes on the vehicle fluid under pressure will be released from the brake cylinder passage 4, pressure chamber 8 in the brake cylinder device 6 and diaphragm chamber 94 in the fluid pressure control device 16. Upon release of fluid under pressure from chamber 8 the spring 9 will return the brake cylinder piston 7 to its brake release position in which it is shown in the drawing. If fluid under pressure is present in the brake cylinder compensating chamber 11 and thereby diaphragm chamber 95 at this time, the diaphragm 85 will be deflected downward by such pressure upon release of fluid under pressure from chamber 94 for unseating the release valve 99, whereby fluid under pressure will be released from the brake cylinder compensating chamber 11 past said valve to atmosphere.

Summary

It will now be seen that I have provided a relatively simple, inexpensive and positively operating brake apparatus for railway vehicles which is adjustable upon charging the usual brake pipe with fluid under pressure to provide, upon subsequently effecting an application of brakes, either one of three different degrees of braking force for a vehicle corresponding to an empty vehicle, a fully loaded vehicle or a partially loaded vehicle.

Having now described my invention, what I claim as new and desire to secure by Letters Patent, is:

1. In a brake apparatus for a vehicle, in combination, a movable brake control element movable to three different, spaced apart, predetermined positions corresponding, respectively, to three different degrees of vehicle braking, first, second and third movable abutments selectively operable by fluid under pressure to move said element to, respectively, one, another or the third of said positions, three stops means, one for each of said abutments, spaced apart according to said positions and engageable by said abutments to limit movement thereof by fluid under pressure and thereby define said positions, respectively, a brake pipe, valve means operative upon charging said brake pipe with fluid under pressure to supply fluid under pressure to one of said abutments, and means adjustable according to the load on the vehicle for supplying fluid under pressure to one or the other of the other two abutments, selectively, according, respectively, to different degrees of load.

2. In a brake apparatus for a vehicle, in combination, a movable brake control element movable to three different, spaced apart, predetermined positions corresponding, respectively, to three different degrees of vehicle braking, first, second and third movable abutments selectively operable by fluid under pressure to move said element to, respectively, one, another or the third of said positions, three stop means, one for each of said abutments, spaced apart according to said positions and engageable by said abutments to limit movement thereof by fluid under pressure and thereby define said positions, respectively, a brake pipe, valve means operative upon charging said brake pipe with fluid under pressure to supply fluid under pressure to one of said abutments, and means adjustable according to the load on the vehicle for establishing communication for flow of said fluid under pressure supplied by said valve means to either one or the other of the other two abutments, selectively, according, respectively, to different degrees of load.

3. In a brake apparatus for a vehicle having sprung and unsprung parts, in combination, a movable brake control element movable to three different spaced apart, predetermined positions corresponding, respectively, to three different degrees of vehicle braking, first, second and third movable abutments selectively operable by fluid under pressure to move said element to, respectively, one, another or the third of said positions, three stop means, one for each of said abutments, spaced apart according to said positions and engageable by said abutments to limit movement thereof by fluid under pressure and thereby define said positions, respectively, a brake pipe, valve means operative upon charging said brake pipe with fluid under pressure to supply fluid under pressure to said first abutment, and means carried by one of said vehicle parts movable by said fluid under pressure supplied by said valve means, a distance which is proportional to the vehicle load, into contact with the other vehicle part for establishing a fluid pressure supply communication to said second movable abutment upon a certain degree of such movement and to said third movable abutment upon a greater degree of movement.

4. In a brake apparatus for a vehicle having sprung and unsprung parts, in combination, a movable brake control element movable to three different, spaced apart, predetermined positions corresponding, respectively, to three different degrees of vehicle braking, first, second and third movable abutments selectively operable by fluid under pressure to move said element to, respectively, one, another or the third of said positions, three stop means, one for each of said abutments, spaced apart according to said positions and engageable by said abutments to limit movement thereof by fluid under pressure and thereby define said positions, respectively, a brake pipe, valve means operative upon charging said brake pipe with fluid under pressure to supply fluid under pressure to said first abutment, a piston carried by one of said vehicle parts subject in a chamber to said fluid under pressure supplied by said valve means and movable thereby a distance proportional to the vehicle load into contact with the other vehicle part, and two pipes for conveying fluid under pressure to said second and third abutments, respectively, and adapted to be opened successively to said chamber by said piston upon said movement of said piston by fluid under pressure.

5. In a brake apparatus for a vehicle having unsprung and load carrying sprung parts, in combination, a movable brake control element movable to three different, spaced apart, predetermined positions corresponding, respectively, to three different degrees of vehicle braking, a first movable abutment adapted to be operated by fluid under pressure to move said element to one of said positions, second and third movable abutments of greater area than said first movable abutment adapted to be operated by fluid under pressure against pressure of fluid on said first abutment to move said element to its other two positions, respectively, a brake pipe, valve means operable upon charging said brake pipe with fluid under pressure to supply fluid under pressure to said first abutment, and means carried by one of said vehicle parts operable by fluid under pressure supplied by said valve means into cooperative relation with the other part for supplying fluid under pressure to either one or the other of the other two abutments depending upon the degree of vehicle load.

6. In a brake apparatus for a vehicle having unsprung and load carrying sprung parts, in combination, a movable brake control element movable to three different, spaced apart, predetermined positions corresponding, respectively, to three different degrees of vehicle braking, a first movable abutment adapted to be operated by fluid under pressure to move said element to one of said positions, second and third movable abutments of greater area than said first movable abutment adapted to be operated by fluid under pressure against pressure of fluid on said first abutment to move said element to its other two positions, respectively, a brake pipe, valve means operable upon charging said brake pipe with fluid under pressure to supply fluid under pressure to said first abutment, a strut device comprising a casing carried by one of said vehicle parts, a piston in said casing and cooperative therewith to form a chamber open to and adapted to receive fluid under pressure supplied by said valve means for moving said piston, means operable by said piston, after a movement thereof by fluid under pressure in said chamber which is proportional to the load on the vehicle, into contact with the other vehicle part, said casing having two passageways spaced apart for opening to said chamber by said piston after, respectively, chosen increments of movement of said piston by fluid under pressure in said chamber, and pipes connecting said passageways to said second and third movable abutments, respectively, for conveying fluid under pressure thereto from said chamber.

7. In a brake apparatus for a vehicle, in combination, a movable brake control element movable to three different, spaced apart, predetermined positions corresponding, respectively, to three different degrees of vehicle braking, first, second and third movable abutments selectively operable by fluid under pressure to move said element to, respectively, one, another or the third of said positions, three stop means, one for each of said abutments, spaced apart according to said positions and engageable by said abutments to limit movement thereof by fluid under pressure and thereby define said positions, respectively, latch means for locking said element in each of said positions and operable by fluid under pressure to release said element for movement, a brake pipe, means operable during charging of said brake pipe to a chosen pressure to supply fluid under pressure to said latch means and to first abutment and operable upon increase in brake pipe pressure above said chosen pressure to release such fluid under pressure, and means adjustable, by said fluid under pressure supplied by said valve means, in accordance with the load on the vehicle for supplying fluid under pressure to said second abutment for a certain degree of load and to said third abutment for a greater degree of load.

8. In a brake apparatus for a vehicle, in combination, a movable brake control element movable to three different, spaced apart, predetermined positions corresponding, respectively, to three different degrees of vehicle braking, first, second and third movable abutments selectively operable by fluid under pressure to move said element to, respectively, one, another or the third of said positions, three stop means, one for each of said abutments, spaced apart according to said positions and engageable by said abutments to limit movement thereof by fluid under pressure and thereby define said positions, respectively, latch means for locking said element in each of said positions and operable by fluid under pressure to release said element for movement, a brake pipe, valve means operable during charging of said brake pipe to a chosen pressure to supply fluid under pressure to said latch means and to said first abutment and operable upon increase in brake pipe pressure above said chosen pressure to release such fluid under pressure, a load carrying vehicle sprung part, and a vehicle unsprung part carrying said sprung part, a strut device carried by one of said parts comprising a casing, a piston in said casing and cooperative therewith to form a pressure chamber to receive fluid under pressure to act on and move said piston relative to said casing, means operable by fluid pressure movement of said piston into contact with the other vehicle part for limiting movement of said piston to a degree proportional to the degree of load on said sprung part, two ports in said casing arranged to be successively opened to said chamber by said piston after a chosen movement thereof by fluid under pressure, and three pipes connected to said casing, one connecting said chamber to said valve means to render said valve means effective to supply fluid under pressure to and release fluid under pressure from said chamber, and the other two pipes connecting said ports to said second and third abutments, respectively, providing control by said piston of supply of fluid under pressure to said second and third abutments.

9. In a vehicle brake apparatus, in combination, a movable brake control element movable to three different, spaced apart, predetermined positions corresponding, respectively, to an empty vehicle, a substantially fully loaded vehicle and a partially loaded vehicle, a first movable abutment connected to said element adapted to be operated by fluid under pressure in a first chamber to move said element to said empty position, second and third movable abutments adapted to be operated by fluid under pressure in second and third chambers to move said element to said substantially fully loaded and partially loaded positions, respectively, against pressure of fluid in said first chamber acting on said first movable abutment, latch means for locking said element in each of said positions and operable by fluid under pressure to release said element for adjustment, vehicle sprung and unsprung parts, a strut device carried by one of said vehicle parts comprising a casing, a piston in said casing and cooperative therewith to form a pressure chamber, means adapted to be operated by said piston, upon movement of said piston in response to supply of fluid under pressure to said pressure chamber, into contact with the other vehicle part for limiting movement of the piston to a degree corresponding to the load on the sprung vehicle part, three pipes connected to said casing, one connecting said pressure chamber to said first chamber, and the other two connecting said second and third chambers to ports in said casing adapted to be successively opened to said pressure chamber by said piston after chosen degrees of movement of said piston by fluid under pressure, a brake pipe, valve means controlled by pressure of fluid in said brake pipe and operative when such pressure is below a chosen degree to supply fluid under pressure to operate said latch means and upon increase to a greater degree to release fluid under pressure from said latch means, and means operable by said latch means upon releasing said element for movement for supplying fluid under pressure to said first chamber and pipe and upon locking said element in an adjusted position to cut off such supply.

References Cited in the file of this patent

UNITED STATES PATENTS

| | | |
|---|---|---|
| 2,344,868 | Hewitt | Mar. 21, 1944 |
| 2,447,857 | Hewitt | Aug. 24, 1948 |
| 2,517,885 | Klein | Aug. 8, 1950 |